US 6,922,833 B2

(12) United States Patent
Forrer, Jr.

(10) Patent No.: US 6,922,833 B2
(45) Date of Patent: Jul. 26, 2005

(54) ADAPTIVE FAST WRITE CACHE FOR STORAGE DEVICES

(75) Inventor: Thomas R. Forrer, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 09/975,247

(22) Filed: Oct. 11, 2001

(65) Prior Publication Data

US 2003/0074531 A1 Apr. 17, 2003

(51) Int. Cl.[7] .............................................. G06F 12/00
(52) U.S. Cl. ...................... 718/100; 711/100; 711/154; 711/167
(58) Field of Search ................................ 718/100, 101; 711/113, 114, 141, 162, 100, 154, 167; 719/321–327, 310; 707/201, 202, 204

(56) References Cited

U.S. PATENT DOCUMENTS

| 4,916,605 A | * | 4/1990 | Beardsley et al. | 711/162 |
| 5,051,887 A | * | 9/1991 | Berger et al. | 711/162 |
| 5,418,921 A | * | 5/1995 | Cortney et al. | 711/114 |
| 5,418,925 A | * | 5/1995 | DeMoss et al. | 711/114 |
| 5,548,711 A | * | 8/1996 | Brant et al. | 714/5 |
| 5,640,530 A | * | 6/1997 | Beardsley et al. | 711/113 |
| 5,749,095 A | * | 5/1998 | Hagersten | 711/141 |
| 6,044,444 A | * | 3/2000 | Ofek | 711/162 |
| 6,513,097 B1 | * | 1/2003 | Beardsley et al. | 711/113 |
| 6,658,542 B2 | * | 12/2003 | Beardsley et al. | 711/162 |

OTHER PUBLICATIONS

IBM Technical Disclosure Bulletin. "Data Volatility Solution for Direct Access Strage Device Fast Write Commands." May 1991.*

* cited by examiner

Primary Examiner—Lewis A. Bullock, Jr.
(74) Attorney, Agent, or Firm—Duke W. Yee; Mark E. McBurney; Lisa B. Yociss

(57) ABSTRACT

A data processing system, method, and product are disclosed for providing an adaptive fast write cache for storage devices. A write cache is provided in a storage device. A FAST WRITE operation is executed utilizing the write cache only when writing particular types of data. A command complete status is returned prior to writing data when a FAST WRITE operation is executed, and a command complete status is returned only after writing data when a FAST WRITE operation is not executed.

18 Claims, 3 Drawing Sheets

ADAPTIVE FAST WRITE CACHE FOR STORAGE DEVICES

BACKGROUND OF THE INVENTION

1. Technical Field

The present invention relates generally to the field of data processing systems and, more specifically to an adaptive fast write cache in storage devices.

2. Description of Related Art

Data processing systems typically include a host computer having a processor and a memory, a storage system, as well as other devices. The storage system can be of any of a number of types (e.g., a tape storage device, a floppy diskette storage device, a disk storage device, etc.), or can include a combination of different types of storage devices.

Application programs executing on the processor typically operate on data that is stored in the storage system. The data from the storage system may be copied to the memory for more efficient access by the host computer. When data in the memory is no longer needed by an application program, the processor typically reads the data from the memory and writes the data to the storage system. Thus, application programs executing on the host computer typically perform numerous reads from and writes to the storage system.

Data stored in the storage device is typically organized in units termed "blocks", where each block includes a number of bytes of data (e.g., 512 bytes). Application programs executing on the host computer typically operate on logical objects (e.g., files) that include a collection of one or more blocks of data that are logically related. The computer system typically includes one or more mapping layers that map from the logical objects operated upon by the application programs to the particular physical locations in the storage system where the blocks that make up the logical object are stored.

The blocks of data that make up a particular logical object are mapped to either sequential or non-sequential physical locations in the storage system. In a typical computer system, the storage system has no understanding that a number of non-sequential physical blocks are logically related. When the host computer executes an operation on a logical object having a plurality of blocks of data stored in non-sequential physical locations in the storage device, the non-sequential blocks must be accessed in separate operations from the storage system, which can impact the performance of the computer system. Thus, sequential data may be read from and written to a storage device must more quickly than non-sequential data.

The time taken during a data writing process can be reduced using a disk cache. When a disk drive controller receives a write command, the data to be stored on the disk is stored in the disk cache. This data is then transferred to the storage device from the disk cache.

During a typical write operation, the data is first written to the disk. When the data has been successfully written to the disk, the disk drive controller will return a command complete status to the processor indicating a successful completion to the write process. If the data is not successfully written to the disk, the command complete status will not be returned. Using this typical write operation, the processor will always know what data has been written to the disk.

A FAST WRITE process is also known in the art and has been frequently used. When the FAST WRITE process is used, the write process is reported to the processor as being complete once the data to be written to the disk is stored in the FAST WRITE cache. Thus, the processor believes that the data has been written to the disk before it actually has been. The data is then written to the disk at a later time.

Although the FAST WRITE process will speed up the data storage process, it can cause data corruption in some cases. The computer system may lose power after the disk drive controller reported a command complete status but before all of the data was written to the disk. If the processor receives a command complete status and power is lost prior to the data actually being stored on the disk, once a reboot occurs, the operating system will believe all of the data that had been stored in the FAST WRITE cache was stored on the disk.

Therefore, a need exists for a method, system, and product for an adaptive fast write cache in storage devices whereby a FAST WRITE operation is executed only for particular types of data.

SUMMARY OF THE INVENTION

A data processing system, method, and product are disclosed for providing an adaptive fast write cache for storage devices. A write cache is provided in a storage device. A FAST WRITE operation is executed utilizing the write cache only when writing particular types of data. A command complete status is returned prior to writing data when a FAST WRITE operation is executed, and a command complete status is returned only after writing data when a FAST WRITE operation is not executed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
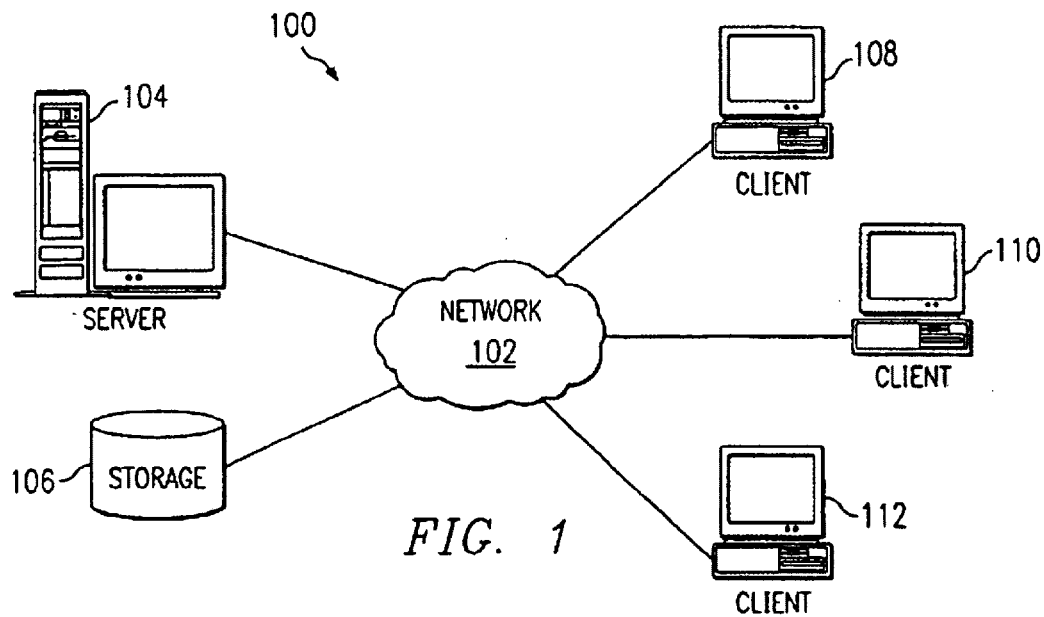
FIG. 1 is a pictorial representation which depicts a data processing system in which the present invention may be implemented in accordance with a preferred embodiment of the present invention.

A preferred embodiment of the present invention and its advantages are better understood by referring to the figures, like numerals being used for like and corresponding parts of the accompanying figures.

The invention is preferably realized using a well-known computing platform, such as an IBM pSeries server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a data processing system, method, and computer program product for providing a disk drive including a disk drive cache used to execute a FAST WRITE operation only for particular types of data. A write cache is provided in a storage device. A FAST WRITE operation is executed utilizing the write cache only when writing particular types of data. A command complete status is returned prior to writing data during a FAST WRITE operation, and a command complete status is returned only after writing data when a FAST WRITE operation is not executed.

A host computer may transmit a command to a disk drive controller to write data. The host computer also stores the data into the fast write cache at this time. If the command complete is never returned to the host, the host never logs the operation as complete. Therefore, if power is lost, file system corruption does not occur.

When a command to write data is received by the disk drive controller, the controller determines whether the data is the particular type of data. If the data is of the particular type, a FAST WRITE operation is executed whereby the data is stored in the FAST WRITE cache, and a command complete status is returned prior to actually writing the data to the disk.

Data is the particular type when it is sequential data that can be written to the disk within a particular time period. The particular time period is the amount of time between when a signal is received that power will be lost and the actual loss of power. If the sequential data is of a length such that it can be written in less time than the time period, the data is the particular type of data and the FAST WRITE operation will be executed.

If the data is either non-sequential, or sequential but of a length such that it cannot be written in less time than the time period, the data is not the particular type of data and the FAST WRITE operation will not be executed.

Multiple write operations could be queued up in the FAST WRITE cache in the hard disk drive if the total time to execute all of them was less than the power loss window period of time. This would result in enhanced write performance, being particularly useful for the case where the host system sends multiple sequential write commands to the hard drive.

The present invention is applicable to many different types of storage devices which use one of many different types of protocols. For example, although the present invention is described primarily with reference to the SCSI protocol, the invention is also applicable in systems which use a Fibre Channel.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
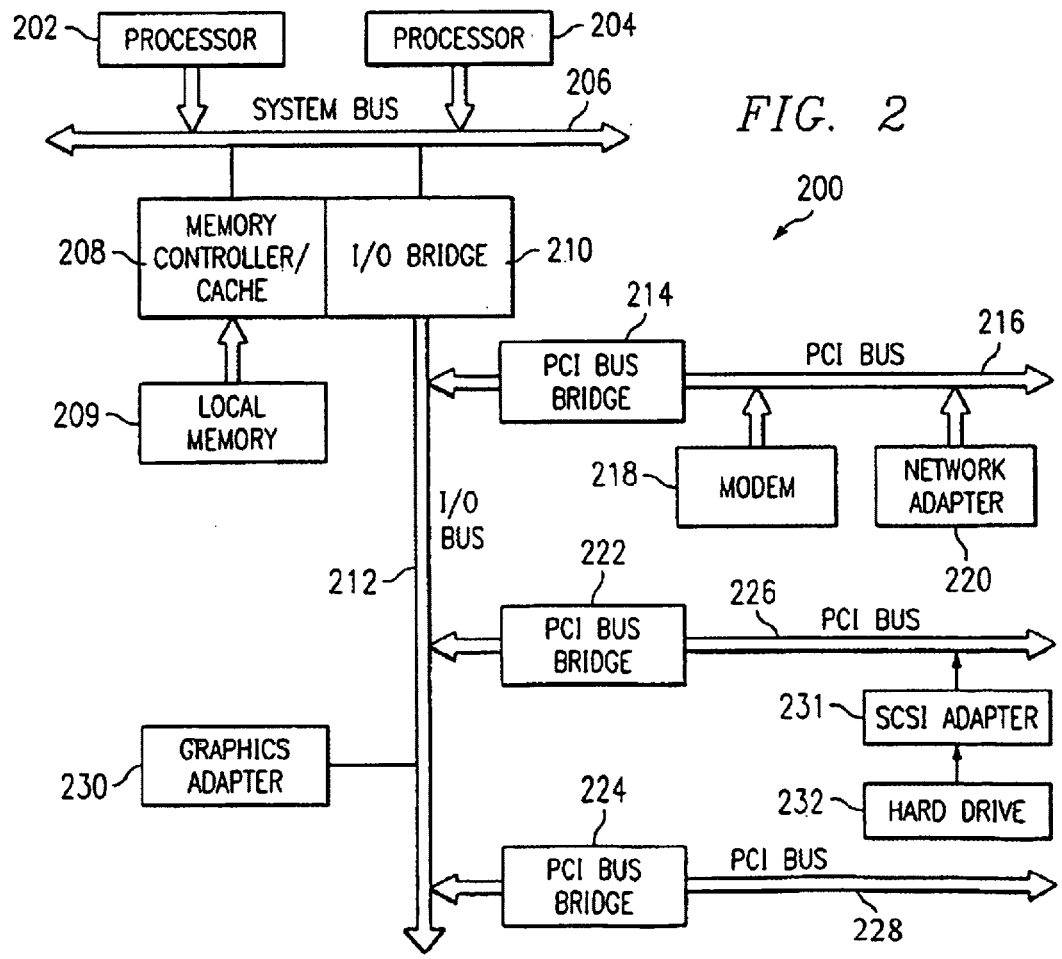
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. One or more of the processors include a performance monitor along with performance monitor counters. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 may also be connected to I/O bus 212 as depicted, either directly or indirectly.

Small computer system interface (SCSI) adapter 231 is coupled to PCI bus 226 and provides an interface for hard drive 232. Alternatively, a Fibre Channel or other suitable type of interface may be used.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
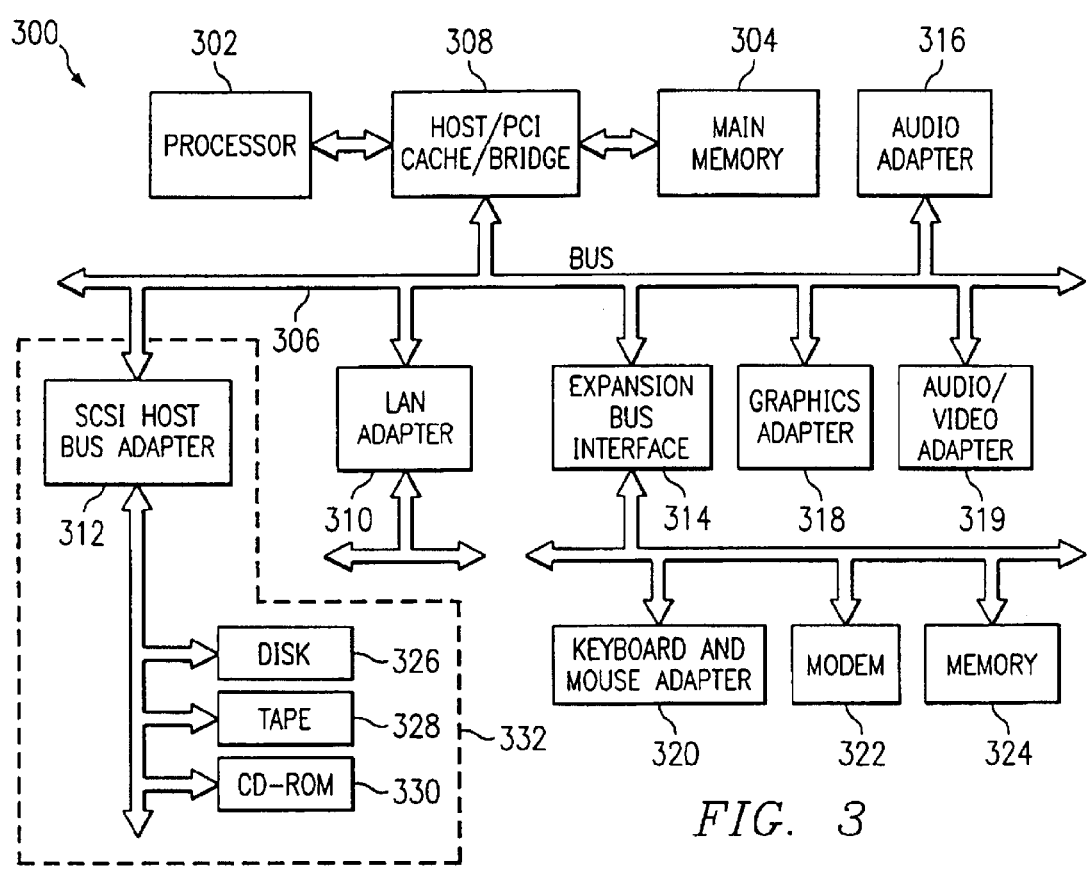
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
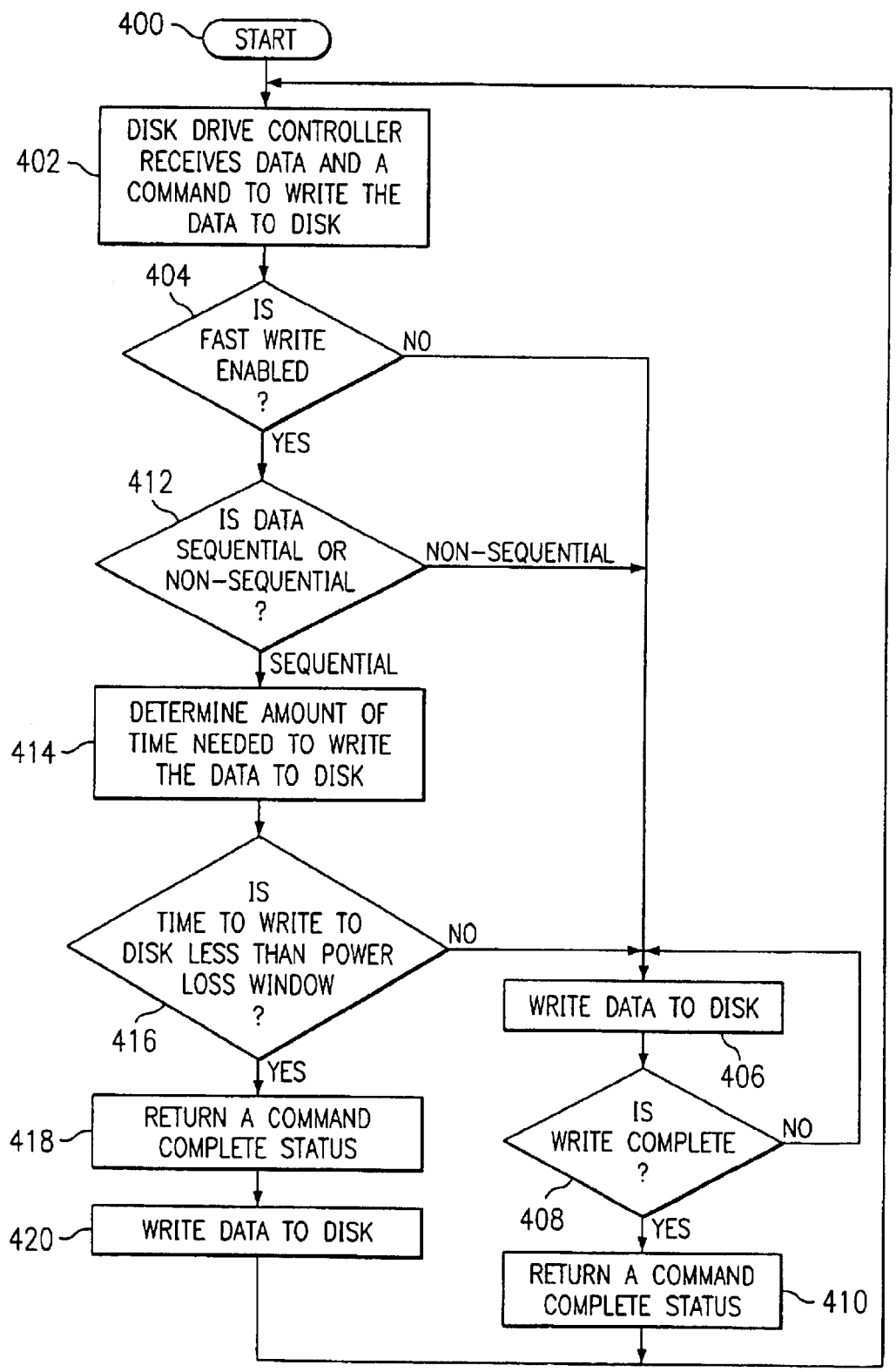
FIG. 4 illustrates a high level flow chart which depicts executing a FAST WRITE operation only for particular types of data in accordance with the present invention.

FIG. 4 illustrates a high level flow chart which depicts executing a FAST WRITE operation only for particular types of data in accordance with the present invention. The process starts as depicted by block 400 and thereafter passes to block 402 which illustrates the disk drive controller receiving a command from the host computer system to write data to the disk. The host computer system sends this command to the disk drive controller and stores the data into the write cache.

Next, block 404 depicts a determination of whether or not the fast write operation is enabled. If a determination is made that the fast write operation is not enabled, the process passes to block 406. Block 406 illustrates the disk controller writing the data to the disk.

Thereafter, block 408 depicts a determination of whether or not all of the data has been written to the disk. If a determination is made that not all of the data has been written to the disk, the process passes back to block 406. Referring again to block 408, if a determination is made that all of the data has been written to the disk, the process passes to block 410 which illustrates the disk drive controller returning a command complete status. The process then passes back to block 402.

Referring again to block 404, if a determination is made that the fast write operation is enabled, the process passes to block 412. Block 412 depicts a determination of whether or not the data to be written to the disk is sequential or non-sequential data. If a determination is made that the data is non-sequential data, the process passes to block 406. Referring again to block 412, if a determination is made that the data is sequential, the process passes to block 414 which illustrates the disk drive controller determining whether or not the time needed to write the data to the disk is less than the power loss window of time. The power loss window of time is the amount of time between when the disk drive controller receives a signal from the power supply that power is about to be lost and the time when the power is actually lost. If a determination is made that the time needed to write the data to the disk is greater than or equal to the power loss window of time, the process passes back to block 406. Referring again to block 416, if a determination is made that the amount of time needed to write the data to the disk is less than the power loss window of time, the process passes to block 418 which depicts the disk drive controller returning a command complete status. Next, block 420 illustrates the disk drive controller writing the data from the write cache to the disk.

In this manner, when the fast write operation is enabled and the disk drive controller is able to determine that it will be able to completely write all of sequential data stored in the fast write cache before a loss of power, the disk drive controller will return a command complete status prior to actually writing the data to the disk. When the fast write operation is disabled, when writing non-sequential data, or when the time required to write sequential data is longer than the power loss window, the disk drive controller will not return a command complete status until the data has all been written to the disk.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a storage device, said method comprising the steps of:
   providing a write cache in said storage device;
   executing a FAST WRITE operation utilizing said write cache only when writing particular types of data, wherein a command complete status is returned prior to writing data during said FAST WRITE operation and a command complete status is returned only after writing data when said FAST WRITE operation is not executed;
   receiving an instruction to write first data to said storage device;
   determining whether said first data is sequential data;
   in response to said first data being sequential data, determining whether said first data can be written within a particular time frame;
   in response to a determination that said first data is sequential data that can be written within said particular time frame, returning a command complete status and then writing said first data to said storage device;
   in response to a determination that said first data is sequential data that cannot be written within said particular time frame, writing said first data to said storage device and then returning a command complete status; and
   in response to a determination that said first data is non-sequential data, writing said first data to said storage device and then returning a command complete status.

2. The method according to claim 1, further comprising the step of executing said FAST WRITE operation only when writing particular amounts of sequential data.

3. The method according to claim 1, further comprising the steps of:
   receiving an instruction to write first data to said storage device;
   determining whether said first data is said particular types of data;
   in response to a determination that said first data is said particular types of data, returning a command complete status and then writing said first data to said storage device; and
   in response to a determination that said first data is said not particular types of data, writing said first data to said storage device and then returning a command complete status.

4. The method according to claim 1, further comprising the step of specifying said particular time frame, wherein said particular time frame is a minimum amount of time between a receipt of a power loss signal and a loss of power to said data processing system.

5. The method according to claim 1, wherein the step of determining whether said first data can be written within a particular time frame further comprises the step of determining an amount of time required to write said first data to said storage device.

6. The method according to claim 5, wherein said step of determining an amount of time required to write said first data to said storage device further comprises the steps of:
   determining an amount of said first data;
   determining a physical location in said storage device where said first data is to be written; and
   determining an amount of time required for a read/write head to move to said physical location.

7. A computer program product in a data processing system including a storage device, said computer program product comprising:
   instruction means for providing a write cache in said storage device;
   instruction means for executing a FAST WRITE operation utilizing said write cache only when writing particular types of data, wherein a command complete status is returned prior to writing data during said FAST WRITE operation and a command complete status is returned only after writing data when said FAST WRITE operation is not executed;
   instruction means for receiving an instruction to write first data to said storage device;
   instruction means for determining whether said first data is sequential data;
   in response to said first data being sequential data, instruction means for determining whether said first data can be written within a particular time frame;
   in response to a determination that said first data is sequential data that can be written within said particular time frame, instruction means for returning a command complete status and then writing said first data to said storage device;
   in response to a determination that said first data is sequential data that cannot be written within said particular time frame, instruction means for writing said first data to said storage device and then returning a command complete status; and in response to a determination that said first data is non-sequential data, instruction means for writing said first data to said storage device and then returning a command complete status.

8. The product according to claim 7, further comprising instruction means for executing said FAST WRITE operation only when writing particular amounts of sequential data.

9. The product according to claim 7, further comprising:

instruction means for receiving an instruction to write first data to said storage device;

instruction means for determining whether said first data is said particular types of data;

in response to a determination that said first data is said particular types of data, instruction means for returning a command complete status and then writing said first data to said storage device; and in response to a determination that said first data is said not particular types of data, instruction means for writing said first data to said storage device and then returning a command complete status.

10. The product according to claim 7, further comprising instruction means for specifying said particular time frame, wherein said particular time frame is a minimum amount of time between a receipt of a power loss signal and a loss of power to said data processing system.

11. The product according to claim 7, wherein said instruction means for determining whether said first data can be written within a particular time frame further comprises instruction means for determining an amount of time required to write said first data to said storage device.

12. The product according to claim 11, wherein said instruction means for determining an amount of time required to write said first data to said storage device further comprises:

instruction means for determining an amount of said first data;

instruction means for determining a physical location in said storage device where said first data is to be written; and instruction means for determining an amount of time required for a read/write head to move to said physical location.

13. A data processing system including a storage device, comprising:

a write cache in said storage device;

a storage device controller for executing a FAST WRITE operation utilizing said write cache only when writing particular types of data, wherein a command complete status is returned prior to writing data during said FAST WRITE operation and a command complete status is returned only after writing data when said FAST WRITE operation is not executed;

said controller for receiving an instruction to write first data to said storage device;

said controller for determining whether said first data is sequential data;

in response to said first data being sequential data, said controller for determining whether said first data can be written within a particular time frame;

in response to a determination that said first data is sequential data that can be written within said particular time frame, said controller for returning a command complete status and then writing said first data to said storage device;

in response to a determination that said first data is sequential data that cannot be written within said particular time frame, said controller for writing said first data to said storage device and then returning a command complete status; and in response to a determination that said first data is non-sequential data, said controller for writing said first data to said storage device and then returning a command complete status.

14. The system according to claim 13, further comprising said controller for executing said FAST WRITE operation utilizing said write cache only when writing particular amounts of sequential data.

15. The system according to claim 13, further comprising:

said controller for receiving an instruction to write first data to said storage device;

said controller for determining whether said first data is said particular types of data;

in response to a determination that said first data is said particular types of data, said controller for returning a command complete status and then writing said first data to said storage device; and in response to a determination that said first data is said not particular types of data, said controller for writing said first data to said storage device and then returning a command complete status.

16. The system according to claim 13, further comprising a particular time frame, wherein said particular time frame is a minimum amount of time between a receipt of a power loss signal and a loss of power to said data processing system.

17. The system according to claim 13, wherein said controller for determining whether said first data can be written within a particular time frame further comprises said controller for determining an amount of time required to write said first data to said storage device.

18. The system according to claim 17, wherein said controller for determining an amount of time required to write said first data to said storage device further comprises:

said controller for determining an amount of said first data;

said controller for determining a physical location in said storage device where said first data is to be written; and said controller for determining an amount of time required for a read/write head to move to said physical location.

* * * * *